United States Patent [19]

Mogami

[11] 4,348,085
[45] Sep. 7, 1982

[54] INVERTED TELEPHOTO TYPE WIDE ANGLE LENS

[75] Inventor: Satoshi Mogami, Kodaira, Japan
[73] Assignee: Nippon Kogaku K.K., Tokyo, Japan
[21] Appl. No.: 170,962
[22] Filed: Jul. 18, 1980
[30] Foreign Application Priority Data

Jul. 26, 1979 [JP] Japan .................... 54-95535

[51] Int. Cl.$^3$ ............................... G02B 13/04
[52] U.S. Cl. ................................... 350/458
[58] Field of Search ......................... 350/458, 463

[56] References Cited
U.S. PATENT DOCUMENTS

| | | | |
|---|---|---|---|
| 3,663,095 | 5/1972 | Mori | 350/485 |
| 4,145,116 | 3/1979 | Ikeda | 350/214 |
| 4,150,872 | 10/1979 | Sugiyama | 350/214 |

Primary Examiner—John K. Corbin
Assistant Examiner—Rebecca D. Gass
Attorney, Agent, or Firm—Shapiro and Shapiro

[57] ABSTRACT

An inverted telephoto type wide angle lens comprises, in succession from the object side, a divergent first group, a diaphragm-forward convergent second group and a diaphragm-rearward convergent third group. The first group includes a positive meniscus lens having its convex surface facing the object side, and three negative meniscus lenses having their convex surfaces facing the object side. The second group includes two positive lenses, a negative meniscus lens having its convex surface facing the object side, and a positive lens. The third group includes a positive meniscus having its convex surface facing the image side, a doublet biconcave negative lens and two positive lenses. The lens system satisfies certain conditions.

4 Claims, 6 Drawing Figures

INVERTED TELEPHOTO TYPE WIDE ANGLE LENS

BACKGROUND OF THE INVENTION

1. Field of the Invention

This invention relates to an inverted telephoto type or so-called retrofocus type great aperture ratio ultra-wide angle lens having an aperture ratio number F2 and an angle of view of the order of 94°.

2. Description of the Prior Art

Generally, in a retrofocus type lens having a great aperture ratio, the wider the angle of view, the more pronounced the aggravation of the off-axis asymmetrical aberration such as coma and the resultant image, even though good in the central portion thereof, shows a conspicuous image flow in the radial directions or in the direction of concentric circles, particularly in the marginal portion of the picture plane, and moreover, presents much flare which tends to lead to a poor contrast. Accordingly, to improve the quality of image in the marginal portion, it is indispensable to eliminate coma which causes flare. However, there are two types of coma, i.e., m coma which is the coma in the meridional plane and S coma which is the coma in the sagittal direction, and when one of these comas is not corrected, the resultant image becomes an image of poor contrast accompanying flare, but S coma is extremely slower in the movement at the aberration correcting stage than m coma and it is therefore difficult to correct S coma and thus, it has been regarded as difficult to develop a great aperture ratio wide angle lens which presents lesser flare. Heretofore, in view of the above-noted difficulty, use has been made of means such as preponderantly correcting the m coma which is easier to correct or employing a non-spherical surface.

SUMMARY OF THE INVENTION

It is an object of the present invention to provide a wide angle lens which comprises spherical surfaces alone and in which various aberrations are well corrected and the coma in the sagittal is reduced and which enables an image of good contrast over the entire picture plane.

The invention will become fully apparent from the following detailed description thereof taken in conjunction with the accompanying drawings.

DESCRIPTION OF THE PREFERRED EMBODIMENTS

Figure 1:
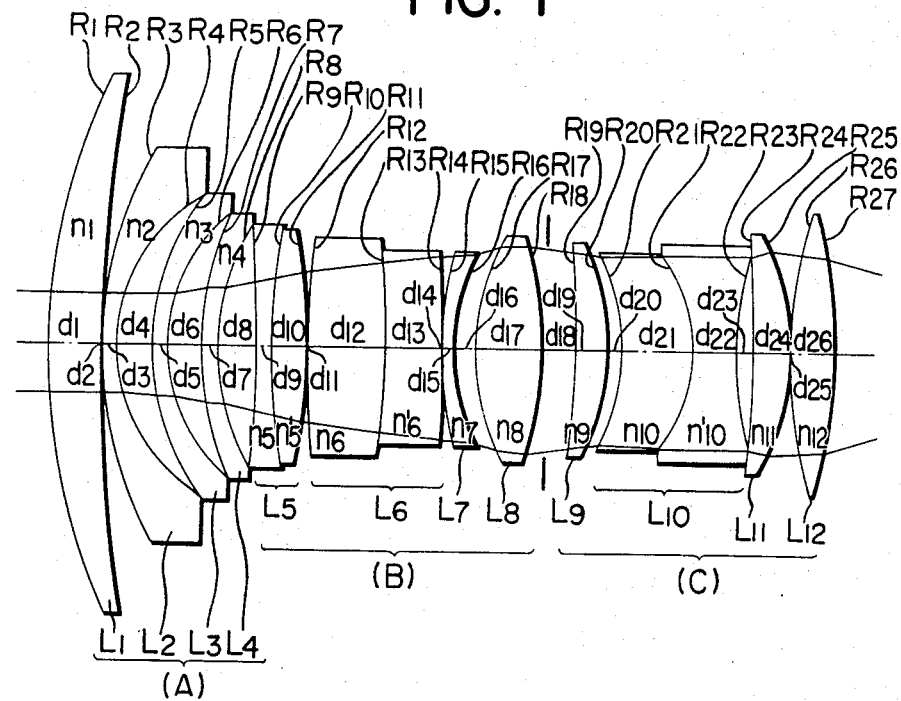
FIGS. 1, 2 and 3 show the lens arrangements of a first, a second and a third embodiment, respectively, of the present invention.

The present invention will hereinafter be described with respect to a first embodiment thereof shown in FIG. 1. As shown, the construction of the present invention comprises three groups. That is, a first group A is a divergent group of negative refractive power as a whole, a second group B is a diaphragm-forward convergent group of positive refractive power as a whole, and a third group C is a diaphragm-rearward convergent group of positive refractive power as a whole. Further, the first group A comprises, in succession from the object side, a positive lens $L_1$ and three continuous negative meniscus lenses $L_2$, $L_3$, $L_4$ each having its convex surface facing the object side, the second group B comprises, in succession from the object side, lenses $L_5$, $L_6$ of small power, a negative meniscus lens $L_7$ having its convex surface facing the object side, and a positive lens $L_8$, and the third group C comprises, in succession from the object side, a positive lens $L_9$, a doublet negative lens $L_{10}$ and two positive lenses $L_{11}$, $L_{12}$. The diaphragm is provided between the second group B and the third group C. This lens system satisfies the following conditions (I) to (III):

$$d_{21}+d_{22}>0.5f \quad (I)$$

$$d_{19}>d_{20} \quad (II)$$

$$0.45R_{15}<R_{16}<0.73R_{15} \quad (III)$$

where f is the total focal length of the entire system, $(d_{21}+d_{22})$ is the center thickness of the lens forming the doublet biconcave negative lens $L_{10}$ in the third group C, $d_{19}$ is the center thickness of the positive lens $L_9$ in the third group C, $d_{20}$ is the air space between the positive lens $L_9$ and the negative lens $L_{10}$ in the third group C, and $R_{15}$ and $R_{16}$ are the curvature radii of the surfaces of the negative meniscus lens $L_7$ in the second group B which are adjacent to the object side and the image side, respectively.

As previously described, it is difficult to correct S coma after the basic construction of the lens has been determined, because the movement at the aberration correcting stage is small. Generally, occurrence of remarkable S coma is seen in an extremely compacted lens system or a lens system in which the burden of aberration correction is concentrated upon a particular lens. Thus, S coma tends to increase in a lens type which bears an unreasonably great burden or aberration correction. Accordingly, to design a great aperture ratio lens system of high performance, it is necessary to examine the amount of occurrence of S coma from the basic construction study stage at which the lens type is chosen and to know that there is no unreasonableness in the type. A retrofocus type lens system, like the present invention, not only has a positive power simply for providing a predetermined focal length but also has a negative power for possessing a predetermined back focal length, and at the same time is imparted a positive power for negating the negative power. Usually, almost all of these positive powers are concentrated on the convergent groups. Accordingly, the convergent groups of a retrofocus type lens system must suppress occurrence of aberrations while having a strong power and thus, bear dual burden. From this, it is no exaggeration to say that the construction of the convergent groups almost determines the possibility of providing a great aperture ratio.

In the present invention, a sufficient length of the optical path of the diaphragm-rearward convergent group C is secured by virtue of condition (I), whereby the correction of spherical aberration and the various aberrations created by the divergent first group A can be reasonably effected to minimize m coma and S coma. In FIG. 1, the light ray from the infinity object point on the axis passing through the negative lens $L_{10}$ of the third group C becomes approximately parallel to the optical axis and therefore, even if the lens thickness is made great, it will in no way adversely affect the spherical aberration, etc. Where $d_{21}+d_{22}$ is less than the lower limit of condition (I), it is difficult to correct spherical aberration and S coma while well correcting other off-axis aberrations and particularly, not only distortion is under-corrected but also flare results from increased m coma, and it is difficult to provide a great aperture ratio. To suppress the flare particularly resulting from excessively great spherical aberration of g-line (wavelength $\lambda=435.8$ nm), it is desirable that in the doublet negative lens $L_{10}$ of the third group C, $\nu_{10}>\nu_{10}'$ and $1.4f>|R_{22}|>0.7f$, where $\nu_{10}$ and $\nu_{10}'$ are the refractive indices of the cemented lenses which are adjacent to the object side and the image side of the cemented surface, and $R_{22}$ is the curvature radius of the convex cemented surface facing the image side. Next, condition (II) is the condition for making compatible the correction of the spherical aberration and the correction of the image plane which are closely related to coma and eliminating the flare resulting from the curvature of image field which is liable to increase from the center of the picture plane to the marginal portion of the picture plane. When condition (II) is not satisfied, spherical aberration is under-corrected or, even if spherical aberration is corrected, the image plane is over-corrected to make it difficult for the image plane correction and the spherical aberration correction to be compatible. Further, to reduce the burden of the divergent first group A and suppress the occurrence of aberrations, the negative lens $L_7$ is disposed as a part of a negative power in the forward convergent second group B within the range of condition (III), thereby securing a predetermined back focal length. This negative lens $L_7$ is relatively near the diaphragm and therefore does not so much affect the distortion. When the upper limit of condition (III) is departed from, it is difficult to secure a predetermined back focal length and, when the lower limit of condition (III) is departed from, the jump-up of light rays at the surface $R_{16}$ of the negative lens $L_7$ which is concave to the image side becomes too intense and brings about remarkable occurrence of spherical aberration. This negative lens $L_7$ has the effect of suppressing the bending of lateral chromatic aberration and therefore, even if it is a negative lens, it is desirable that the Abbe number $\nu_7$ thereof the $\nu_7>40$. Also, the cemented surface of the negative lens $L_{10}$ in the third group C should desirably be convex toward the image side in order to well maintain the lateral chromatic aberration.

Figure 2:
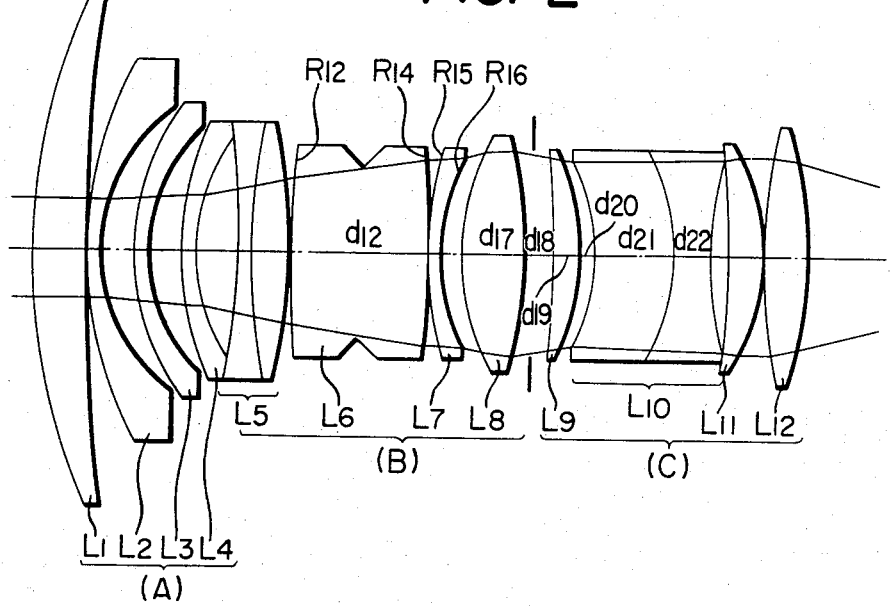
Figure 3:
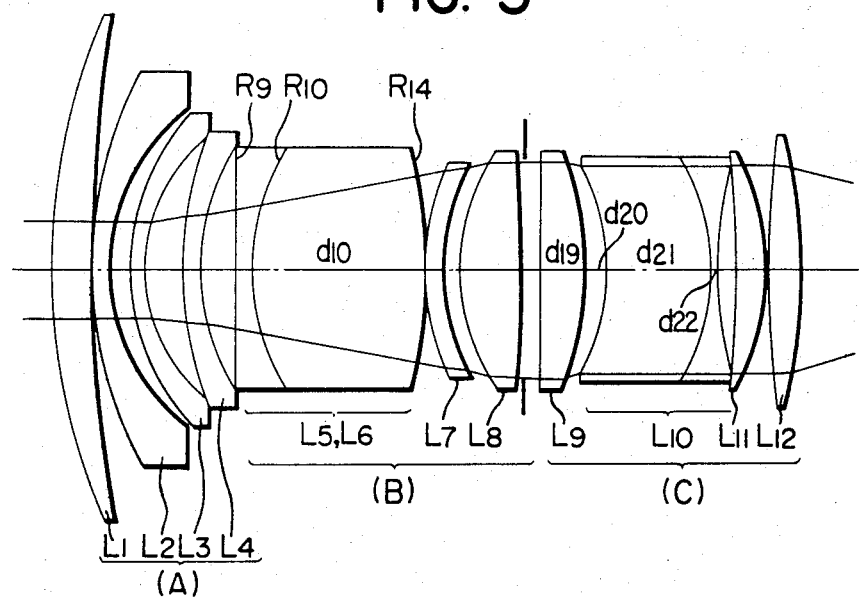

A second embodiment shown in FIG. 2 is one in which the joined surfaces of the sixth lens $L_6$ are eliminated to decrease the number of surfaces of the lenses and improve the productivity. A third embodiment shown in FIG. 3 is one in which the air lens between the fifth and sixth lenses $L_5$ and $L_6$ of small power is eliminated to reduce the air contact surface which may cause ghost.

Various numeral data of each embodiment will be shown below. In the tables below, $R_1, R_2, R_3, \ldots, R_{27}$ represent the curvature radii of the successive lens surfaces in order from the object side, $d_1, d_2, d_3, \ldots, d_{26}$ represent the intervals betweeen the successive lens surfaces, and nd and $\nu d$ represent the refractive indices and Abbe numbers, respectively, of the successive lenses for d-line (wavelength $\lambda=587.6$ mm).

First embodiment:
Total focal length of entire system $f = 1.0$,
Angle of view $2w = 94°$, F-number 2.0

| | | | | | | | |
|---|---|---|---|---|---|---|---|
| $R_1 = 3.431$ | $d_1 = 0.270$ | $nd_1 = 1.50137$ | $\nu d_1 = 56.5$ |
| $R_2 = 10.292$ | $d_2 = 0.005$ | | |
| $R_3 = 2.005$ | $d_3 = 0.074$ | $nd_2 = 1.78797$ | $\nu d_2 = 47.5$ |
| $R_4 = 0.897$ | $d_4 = 0.181$ | | |
| $R_5 = 1.313$ | $d_5 = 0.074$ | $nd_3 = 1.78797$ | $\nu d_3 = 47.5$ |
| $R_6 = 0.875$ | $d_6 = 0.172$ | | |
| $R_7 = 1.792$ | $d_7 = 0.074$ | $nd_4 = 1.7481$ | $\nu d_4 = 52.2$ |
| $R_8 = 1.141$ | $d_8 = 0.196$ | | |
| $R_9 = -6.042$ | $d_9 = 0.064$ | $nd_5 = 1.80411$ | $\nu d_5 = 46.6$ |
| $R_{10} = 3.500$ | $d_{10} = 0.191$ | $nd_5' = 1.59507$ | $\nu d_5' = 35.6$ |
| $R_{11} = -2.714$ | $d_{11} = 0.005$ | | |
| $R_{12} = 7.370$ | $d_{12} = 0.382$ | $nd_6 = 1.75692$ | $\nu d_6 = 31.7$ |
| $R_{13} = -3.922$ | $d_{13} = 0.282$ | $nd_6' = 1.7481$ | $\nu d_6' = 52.2$ |
| $R_{14} = -36.208$ | $d_{14} = 0.005$ | | |
| $R_{15} = 2.208$ | $d_{15} = 0.054$ | $nd_7 = 1.6968$ | $\nu d_7 = 55.6$ |
| $R_{16} = 1.137$ | $d_{16} = 0.108$ | | |
| $R_{17} = 1.127$ | $d_{17} = 0.333$ | $nd_8 = 1.6228$ | $\nu d_8 = 56.9$ |
| $R_{18} = -1.843$ | $d_{18} = 0.181$ | | |
| $R_{19} = -3.824$ | $d_{19} = 0.157$ | $nd_9 = 1.72342$ | $\nu d_9 = 47.0$ |
| $R_{20} = -1.172$ | $d_{20} = 0.075$ | | |
| $R_{21} = -0.877$ | $d_{21} = 0.346$ | $nd_{10} = 1.713$ | $\nu d_{10} = 53.9$ |
| $R_{22} = -0.809$ | $d_{22} = 0.228$ | $nd_{10}' = 1.79504$ | $\nu d_{10}' = 28.4$ |
| $R_{23} = 2.760$ | $d_{23} = 0.076$ | | |
| $R_{24} = -8.761$ | $d_{24} = 0.186$ | $nd_{11} = 1.79668$ | $\nu d_{11} = 45.4$ |
| $R_{25} = -1.186$ | $d_{25} = 0.005$ | | |
| $R_{26} = 3.257$ | $d_{26} = 0.221$ | $nd_{12} = 1.50032$ | $\nu d_{12} = 81.9$ |
| $R_{27} = -2.499$ | | | |

Back focal length $Bf = 1.844$

Second Embodiment:
Total focal length of entire system $f = 1.0$,
Angle of view $2w = 94°$, F-number 2.0

| | | | | | | | |
|---|---|---|---|---|---|---|---|
| $R_1 = 3.431$ | $d_1 = 0.270$ | $nd_1 = 1.50137$ | $\nu d_1 = 56.5$ |
| $R_2 = 10.292$ | $d_2 = 0.005$ | | |
| $R_3 = 2.020$ | $d_3 = 0.074$ | $nd_2 = 1.78797$ | $\nu d_2 = 47.5$ |
| $R_4 = 0.897$ | $d_4 = 0.181$ | | |
| $R_5 = 1.313$ | $d_5 = 0.074$ | $nd_3 = 1.78797$ | $\nu d_3 = 47.5$ |
| $R_6 = 0.875$ | $d_6 = 0.172$ | | |
| $R_7 = 1.792$ | $d_7 = 0.074$ | $nd_4 = 1.74629$ | $\nu d_4 = 52.3$ |
| $R_8 = 1.141$ | $d_8 = 0.196$ | | |
| $R_9 = -6.042$ | $d_9 = 0.064$ | $nd_5 = 1.80218$ | $\nu d_5 = 46.6$ |
| $R_{10} = 4.337$ | $d_{10} = 0.191$ | $nd_5' = 1.59507$ | $\nu d_5' = 35.6$ |
| $R_{11} = -2.637$ | $d_{11} = 0.017$ | | |
| $R_{12} = 17.304$ | $d_{12} = 0.696$ | $nd_6 = 1.7552$ | $\nu d_6 = 27.5$ |
| $R_{14} = -8.824$ | $d_{14} = 0.005$ | | |
| $R_{15} = 2.127$ | $d_{15} = 0.054$ | $nd_7 = 1.6968$ | $\nu d_7 = 55.6$ |
| $R_{16} = 1.147$ | $d_{16} = 0.103$ | | |
| $R_{17} = 1.137$ | $d_{17} = 0.333$ | $nd_8 = 1.6223$ | $\nu d_8 = 53.1$ |
| $R_{18} = -1.985$ | $d_{18} = 0.142$ | | |
| $R_{19} = -3.824$ | $d_{19} = 0.123$ | $nd_9 = 1.72342$ | $d_9 = 38.0$ |
| $R_{20} = -1.261$ | $d_{20} = 0.083$ | | |
| $R_{21} = -0.940$ | $d_{21} = 0.431$ | $nd_{10} = 1.713$ | $\nu d_{10} = 53.9$ |
| $R_{22} = -0.900$ | $d_{22} = 0.162$ | $nd_{10}' = 1.79504$ | $d_{10}' = 28.4$ |
| $R_{23} = 2.463$ | $d_{23} = 0.076$ | | |
| $R_{24} = -8.761$ | $d_{24} = 0.186$ | $nd_{11} = 1.76684$ | $\nu d_{11} = 45.4$ |
| $R_{25} = -1.191$ | $d_{25} = 0.005$ | | |
| $R_{26} = 3.152$ | $d_{26} = 0.228$ | $nd_{12} = 1.50032$ | $\nu d_{12} = 81.9$ |
| $R_{27} = -2.279$ | | | |

Back focal length $Bf = 1.853$
($R_{13}$, $d_{13}$, $nd_6'$, and $\nu d_6'$ are missing numbers)

Third Embodiment:
Total focal length of entire system $f = 1.0$,
Angle of view $2w = 940$, F-number 2.0

| | | | | | | | |
|---|---|---|---|---|---|---|---|
| $R_1 = 3.284$ | $d_1 = 0.196$ | $nd_1 = 1.6172$ | $\nu d_1 = 54.0$ |
| $R_2 = 8.018$ | $d_2 = 0.005$ | | |
| $R_3 = 2.026$ | $d_3 = 0.093$ | $nd_2 = 1.79877$ | $\nu d_2 = 44.3$ |
| $R_4 = 0.980$ | $d_4 = 0.108$ | | |
| $R_5 = 1.181$ | $d_5 = 0.078$ | $nd_3 = 1.79877$ | $\nu d_3 = 44.3$ |
| $R_6 = 0.858$ | $d_6 = 0.184$ | | |
| $R_7 = 1.934$ | $d_7 = 0.088$ | $nd_4 = 1.74443$ | $\nu d_4 = 49.4$ |
| $R_8 = 1.121$ | $d_8 = 0.187$ | | |
| $R_9 = 271.649$ | $d_9 = 0.074$ | $nd_5 = 1.79877$ | $\nu d_5 = 44.3$ |
| $R_{10} = 1.074$ | $d_{10} = 0.882$ | $nd_5' = 1.58144$ | $\nu d_5' = 40.8$ |
| $R_{14} = -2.589$ | $d_{14} = 0.005$ | | |
| $R_{15} = 1.412$ | $d_{15} = 0.064$ | $nd_7 = 1.6968$ | $\nu d_7 = 55.6$ |
| $R_{16} = 0.926$ | $d_{16} = 0.103$ | | |
| $R_{17} = 1.076$ | $d_{17} = 0.309$ | $nd_8 = 1.60562$ | $\nu d_8 = 43.9$ |
| $R_{18} = -10.455$ | $d_{18} = 0.103$ | | |
| $R_{19} = -49.020$ | $d_{19} = 0.240$ | $nd_9 = 1.75692$ | $\nu d_9 = 31.7$ |
| $R_{20}' = -1.287$ | $d_{20} = 0.093$ | | |
| $R_{21} = -1.065$ | $d_{21} = 0.534$ | $nd_{10} = 1.713$ | $d_{10} = 53.9$ |

-continued

| | | | | | |
|---|---|---|---|---|---|
| $R_{22} = -0.940$ | $d_{22} = 0.039$ | $nd_{10}' = 1.80518$ | $d_{10}' = 25.5$ | | |
| $R_{23} = 2.428$ | $d_{23} = 0.078$ | | | | |
| $R_{24} = -11.176$ | $d_{24} = 0.167$ | $nd_{11} = 1.713$ | $vd_{11} = 53.9$ | | |
| $R_{25} = -1.181$ | $d_{25} = 0.005$ | | | | |
| $R_{26} = 6.029$ | $d_{26} = 0.176$ | $nd_{12} = 1.60311$ | $vd_{12} = 60.7$ | | |
| $R_{27} = -2.194$ | | | | | |

Back focal length Bf = 1.931
($R_{11}$–$R_{13}$, $d_{11}$–$d_{13}$, $nd_6$, $nd_6'$, $vd_6$ and $vd_6'$ are missing numbers).

Figure 6:
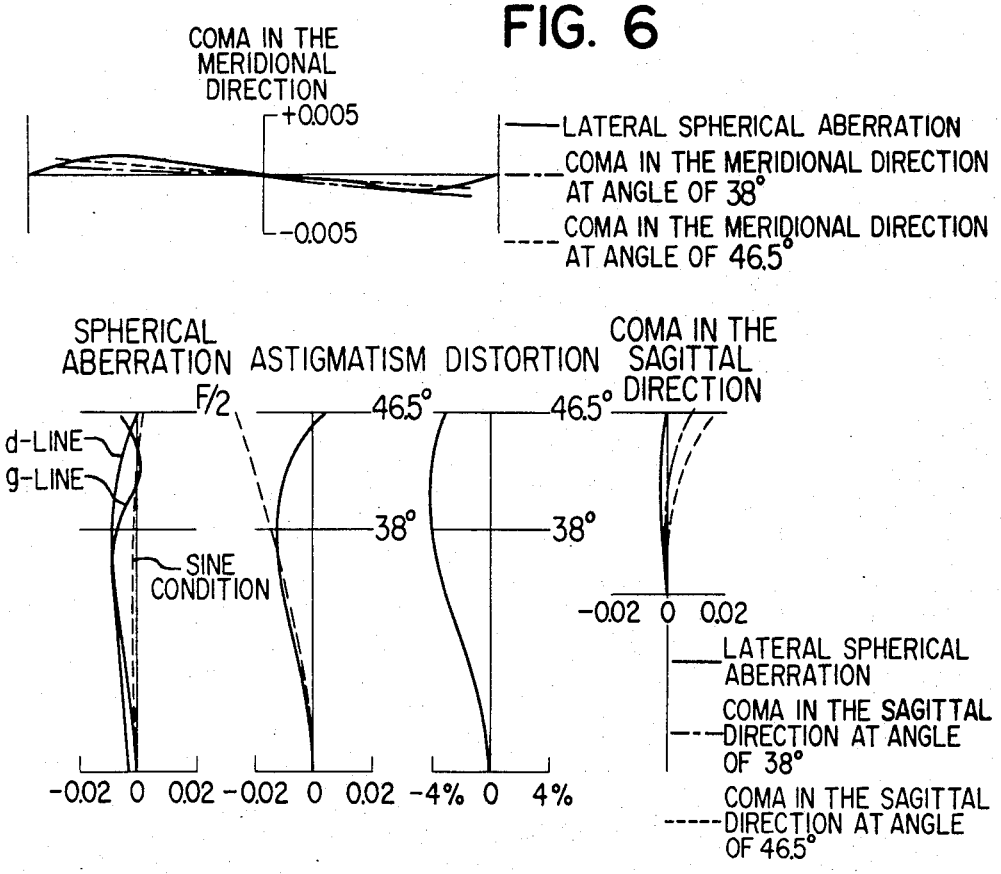
FIGS. 4, 5 and 6 show various aberrations at f=1.0 in the first, the second and the third embodiments, respectively.
Figure 4:
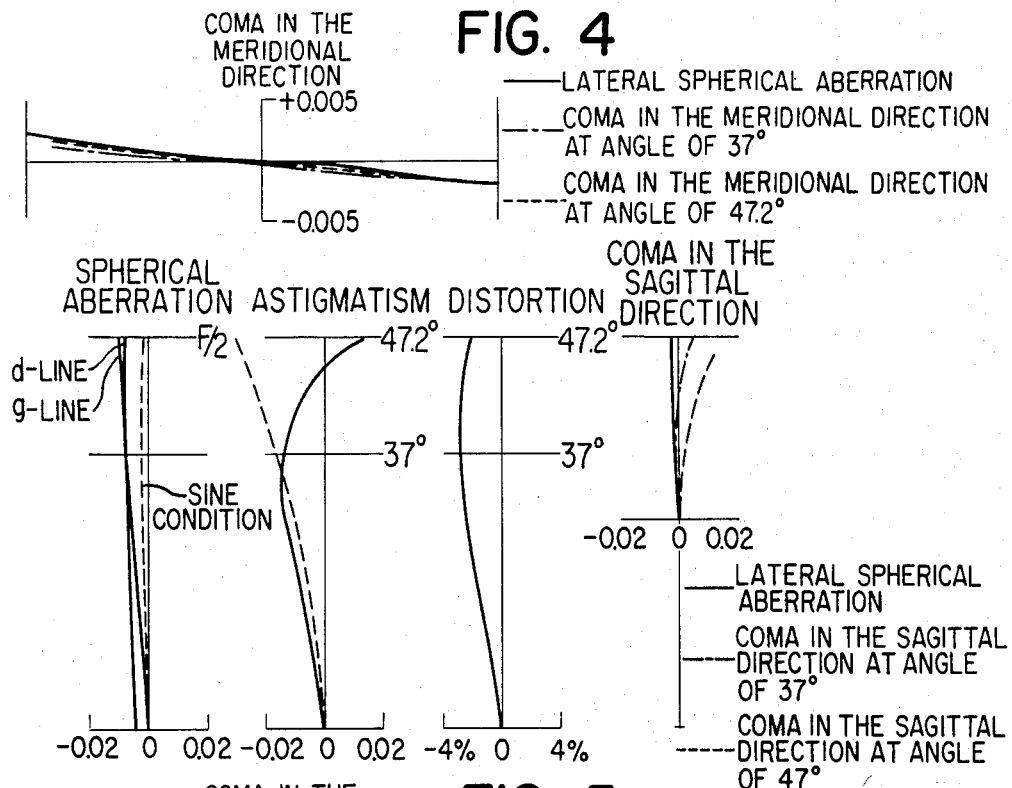
Figure 5:
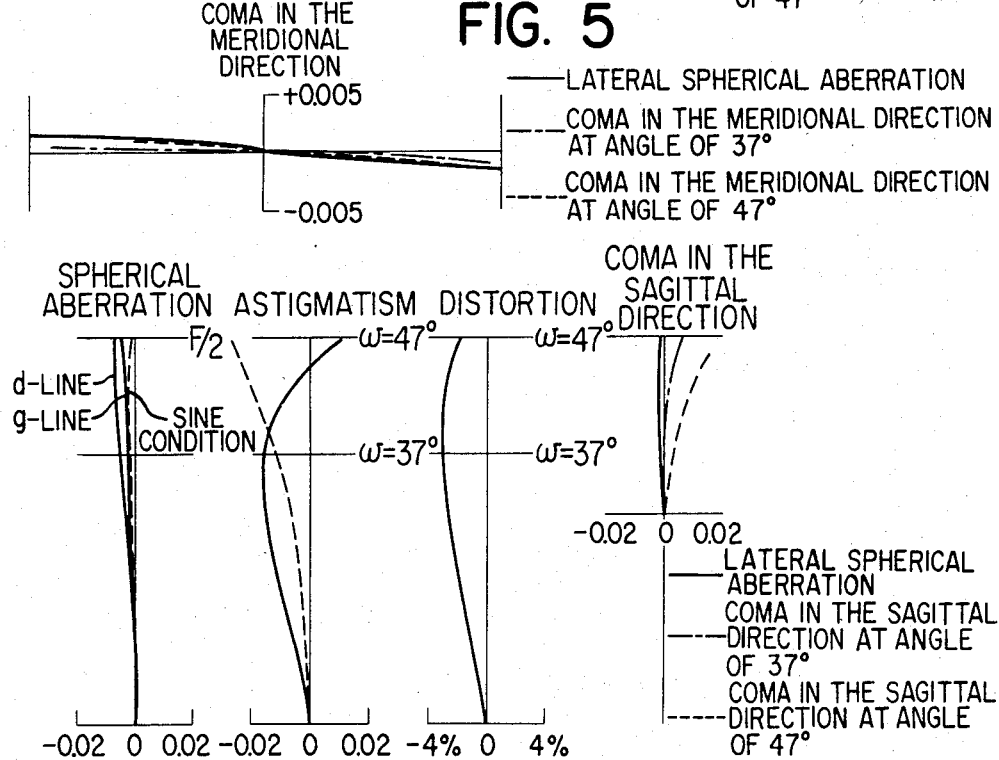

The various aberrations in the respective embodiments are shown in FIGS. 4, 5 and 6, respectively. From these Figures, it is seen that in spite of the fact that the great aperture ratio ultra-wide angle lens according to the present invention comprises spherical surfaces alone, various aberrations including coma are well corrected.

I claim:

1. An inverted telephoto type wide angle lens comprising, in succession from the object side, a divergent first group (A) including a positive meniscus lens ($L_1$) having its convex surface facing the object side, and negative meniscus lenses ($L_2$–$L_4$) having their convex surfaces facing the object side; a diaphragm-forward convergent second group (B) including positive lenses ($L_5$, $L_6$), a positive lens ($L_8$) and a negative meniscus lens ($L_7$) disposed between said positive lenses ($L_5$, $L_6$) and said positive lens ($L_8$) and having its convex surface facing the object side; and a diaphragm-rearward convergent third group (C) including a positive meniscus lens ($L_9$) having its convex surface facing the image side, positive lenses ($L_{11}$, $L_{12}$) and a doublet biconcave negative lens ($L_{10}$) disposed between said positive meniscus lens ($L_9$) and said positive lenses ($L_{11}$, $L_{12}$); said inverted telephoto type wide angle lens satisfying the following conditions:

$$d_{21} + d_{22} > 0.5f \quad (I)$$

$$d_{19} > d_{20} \quad (II)$$

$$0.45 R_{15} < R_{16} < 0.73 R_{15} \quad (III)$$

where f is the total focal length of the entire system, ($d_{21} + d_{22}$) is the center thickness of the lens forming the biconcave negative lens ($L_{10}$) in said third group (C), $d_{19}$ is the center thickness of the positive meniscus lens ($L_9$) in said third group (C), $d_{20}$ is the air space between the positive meniscus lens ($L_9$) and the negative lens ($L_{10}$) in said third group (C), and $R_{15}$ and $R_{16}$ are the curvature radii of the surfaces of the negative lens ($L_7$) in said second group (B) which are adjacent to the object side and the image side, respectively.

2. An inverted telephoto type wide angle lens according to claim 1, wherein numerical data are as follows:

Total focal length of entire system f = 1.0,
Angle of view 2w = 94°, F-number 2.0

| | | | | | |
|---|---|---|---|---|---|
| $R_1 = 3.431$ | $d_1 = 0.270$ | $nd_1 = 1.50137$ | $vd_1 = 56.5$ | | |
| $R_2 = 10.292$ | $d_2 = 0.005$ | | | | |
| $R_3 = 2.005$ | $d_3 = 0.074$ | $nd_2 = 1.78797$ | $vd_2 = 47.5$ | | |
| $R_4 = 0.897$ | $d_4 = 0.181$ | | | | |
| $R_5 = 1.313$ | $d_5 = 0.074$ | $nd_3 = 1.78797$ | $vd_3 = 47.5$ | | |
| $R_6 = 0.875$ | $d_6 = 0.172$ | | | | |
| $R_7 = 1.792$ | $d_7 = 0.074$ | $nd_4 = 1.7481$ | $vd_4 = 52.2$ | | |
| $R_8 = 1.141$ | $d_8 = 0.196$ | | | | |
| $R_9 = -6.042$ | $d_9 = 0.064$ | $nd_5 = 1.80411$ | $vd_5 = 46.6$ | | |
| $R_{10} = 3.500$ | $d_{10} = 0.191$ | $nd_5' = 1.59507$ | $vd_5' = 35.6$ | | |
| $R_{11} = -2.714$ | $d_{11} = 0.005$ | | | | |
| $R_{12} = 7.370$ | $d_{12} = 0.382$ | $nd_6 = 1.75692$ | $vd_6 = 31.7$ | | |
| $R_{13} = -3.922$ | $d_{13} = 0.282$ | $nd_6' = 1.7481$ | $vd_6' = 52.2$ | | |
| $R_{14} = -36.208$ | $d_{14} = 0.005$ | | | | |
| $R_{15} = 2.208$ | $d_{15} = 0.054$ | $nd_7 = 1.6968$ | $vd_7 = 55.6$ | | |
| $R_{16} = 1.137$ | $d_{16} = 0.108$ | | | | |
| $R_{17} = 1.127$ | $d_{17} = 0.333$ | $nd_8 = 1.6228$ | $vd_8 = 56.9$ | | |
| $R_{18} = -1.843$ | $d_{18} = 0.181$ | | | | |
| $R_{19} = -3.824$ | $d_{19} = 0.157$ | $nd_9 = 1.72342$ | $vd_9 = 47.0$ | | |
| $R_{20} = -1.172$ | $d_{20} = 0.075$ | | | | |
| $R_{21} = -0.877$ | $d_{21} = 0.346$ | $nd_{10} = 1.713$ | $d_{10} = 53.9$ | | |
| $R_{22} = -0.809$ | $d_{22} = 0.228$ | $nd_{10}' = 1.79504$ | $d_{10}' = 28.4$ | | |
| $R_{23} = 2.760$ | $d_{23} = 0.076$ | | | | |
| $R_{24} = -8.761$ | $d_{24} = 0.186$ | $nd_{11} = 1.79668$ | $vd_{11} = 45.4$ | | |
| $R_{25} = -1.186$ | $d_{25} = 0.005$ | | | | |
| $R_{26} = 3.257$ | $d_{26} = 0.221$ | $nd_{12} = 1.50032$ | $vd_{12} = 81.9$ | | |
| $R_{27} = -2.499$ | | | | | |

Back focal length Bf = 1.844 where $R_1$, $R_2$, $R_3$, ..., $R_{27}$ represent the curvature radii of the successive lens surfaces in order from the object side, $d_1$, $d_2$, $d_3$, ..., $d_{26}$ represent the intervals between the successive lens surfaces, and nd and vd represent the refractive indices and Abbe numbers, respectively, of the successive lenses for d-line (wavelength λ=587.6 nm).

3. An inverted telephoto type wide angle lens according to claim 1, wherein numerical data are as follows:

Total focal length of entire system f = 1.0,
Angle of view 2w = 94°, F-number 2.0

| | | | | | |
|---|---|---|---|---|---|
| $R_1 = 3.431$ | $d_1 = 0.270$ | $nd_1 = 1.50137$ | $vd_1 = 56.5$ | | |
| $R_2 = 10.292$ | $d_2 = 0.005$ | | | | |
| $R_3 = 2.020$ | $d_3 = 0.074$ | $nd_2 = 1.78797$ | $vd_2 = 47.5$ | | |
| $R_4 = 0.897$ | $d_4 = 0.181$ | | | | |
| $R_5 = 1.313$ | $d_5 = 0.074$ | $nd_3 = 1.78797$ | $vd_3 = 47.5$ | | |
| $R_6 = 0.875$ | $d_6 = 0.172$ | | | | |
| $R_7 = 1.792$ | $d_7 = 0.074$ | $nd_4 = 1.74629$ | $vd_4 = 52.3$ | | |
| $R_8 = 1.141$ | $d_8 = 0.196$ | | | | |
| $R_9 = -6.042$ | $d_9 = 0.064$ | $nd_5 = 1.80218$ | $vd_5 = 46.6$ | | |
| $R_{10} = 4.337$ | $d_{10} = 0.191$ | $nd_5' = 1.59507$ | $vd_5' = 35.6$ | | |
| $R_{11} = -2.637$ | $d_{11} = 0.017$ | | | | |
| $R_{12} = 17.304$ | $d_{12} = 0.696$ | $nd_6 = 1.7552$ | $vd_6 = 27.5$ | | |
| $R_{14} = -8.824$ | $d_{14} = 0.005$ | | | | |
| $R_{15} = 2.127$ | $d_{15} = 0.054$ | $nd_7 = 1.6968$ | $vd_7 = 55.6$ | | |
| $R_{16} = 1.147$ | $d_{16} = 0.103$ | | | | |
| $R_{17} = 1.137$ | $d_{17} = 0.333$ | $nd_8 = 1.6223$ | $vd_8 = 53.1$ | | |
| $R_{18} = -1.985$ | $d_{18} = 0.142$ | | | | |
| $R_{19} = -3.824$ | $d_{19} = 0.123$ | $nd_9 = 1.72342$ | $vd_9 = 38.0$ | | |
| $R_{20} = -1.261$ | $d_{20} = 0.083$ | | | | |
| $R_{21} = -0.940$ | $d_{21} = 0.431$ | $nd_{10} = 1.713$ | $d_{10} = 53.9$ | | |
| $R_{22} = -0.900$ | $d_{22} = 0.162$ | $nd_{10}' = 1.79504$ | $d_{10}' = 28.4$ | | |
| $R_{23} = 2.463$ | $d_{23} = 0.076$ | | | | |
| $R_{24} = -8.761$ | $d_{24} = 0.186$ | $nd_{11} = 1.76684$ | $vd_{11} = 45.4$ | | |
| $R_{25} = -1.191$ | $d_{25} = 0.005$ | | | | |
| $R_{26} = 3.152$ | $d_{26} = 0.228$ | $nd_{12} = 1.50032$ | $vd_{12} = 81.9$ | | |
| $R_{27} = -2.279$ | | | | | |

Back focal length Bf = 1.853
($R_{13}$, $d_{13}$, $nd_6'$, and $vd_6'$ are missing numbers)

where $R_1$, $R_2$, $R_3$, ..., $R_{27}$ represent the curvature radii of the successive lens surfaces in order from the object side, $d_1$, $d_2$, $d_3$, ... $d_{26}$ represent the intervals between the successive lens surfaces, and nd and vd represent the refractive indices and Abbe numbers, respectively, of the successive lenses for d-line (wavelength λ=587.6 nm).

4. An inverted telephoto type wide angle lens according to claim 1, wherein numerical data are as follows:

| Total focal length of entire system $f = 1.0$, Angle of view $2w = 94°$, F-number 2.0 | | | | | |
|---|---|---|---|---|---|
| $R_1 = 3.284$ | $d_1 = 0.196$ | $nd_1 = 1.6172$ | | $vd_1 = 54.0$ | |
| $R_2 = 8.018$ | $d_2 = 0.005$ | | | | |
| $R_3 = 2.026$ | $d_3 = 0.093$ | $nd_2 = 1.79877$ | | $vd_2 = 44.3$ | |
| $R_4 = 0.980$ | $d_4 = 0.108$ | | | | |
| $R_5 = 1.181$ | $d_5 = 0.078$ | $nd_3 = 1.79877$ | | $vd_3 = 44.3$ | |
| $R_6 = 0.858$ | $d_6 = 0.184$ | | | | |
| $R_7 = 1.934$ | $d_7 = 0.088$ | $nd_4 = 1.74443$ | | $vd_4 = 49.4$ | |
| $R_8 = 1.121$ | $d_8 = 0.187$ | | | | |
| $R_9 = 271.649$ | $d_9 = 0.074$ | $nd_5 = 1.79877$ | | $vd_5 = 44.3$ | |
| $R_{10} = 1.074$ | $d_{10} = 0.882$ | $nd_5' = 1.58144$ | | $vd_5' = 40.8$ | |
| $R_{14} = -2.589$ | $d_{14} = 0.005$ | | | | |
| $R_{15} = 1.412$ | $d_{15} = 0.064$ | $nd_7 = 1.6968$ | | $vd_7 = 55.6$ | |
| $R_{16} = 0.926$ | $d_{16} = 0.103$ | | | | |
| $R_{17} = 1.076$ | $d_{17} = 0.309$ | $nd_8 = 1.60562$ | | $vd_8 = 43.9$ | |
| $R_{18} = -10.455$ | $d_{18} = 0.103$ | | | | |
| $R_{19} = -49.020$ | $d_{19} = 0.240$ | $nd_9 = 1.75692$ | | $vd_9 = 31.7$ | |
| $R_{20} = -1.287$ | $d_{20} = 0.093$ | | | | |
| $R_{21} = -1.065$ | $d_{21} = 0.534$ | $nd_{10} = 1.713$ | | $vd_{10} = 53.9$ | |
| $R_{22} = -0.940$ | $d_{22} = 0.039$ | $nd_{10}' = 1.80518$ | | $vd_{10}' = 25.5$ | |
| $R_{23} = 2.428$ | $d_{23} = 0.078$ | | | | |
| $R_{24} = -11.176$ | $d_{24} = 0.167$ | $nd_{11} = 1.713$ | | $vd_{11} = 53.9$ | |
| $R_{25} = -1.181$ | $d_{25} = 0.005$ | | | | |
| $R_{26} = 6.029$ | $d_{26} = 0.176$ | $nd_{12} = 1.60311$ | | $vd_{12} = 60.7$ | |
| $R_{27} = -2.194$ | | | | | |
| Back focal length $Bf = 1.931$ | | | | | |

($R_{11}$–$R_{13}$, $d_{11}$–$d_{13}$, $nd_6$, $nd_6'$, $vd_6$ and $vd_6'$ are missing numbers)

where $R_1, R_2, R_3, \ldots, R_{27}$ represent the curvature radii of the successive lens surfaces in order from the object side, $d_1, d_2, d_3, \ldots, d_{26}$ represent the intervals between the successive lens surfaces, and $nd$ and $vd$ represent the refractive indices and Abbe numbers, respectively, of the successive lenses for d-line (wavelength $\lambda = 587.6$ nm).

* * * * *